United States Patent
Kinmartin et al.

(10) Patent No.: US 7,175,398 B2
(45) Date of Patent: Feb. 13, 2007

(54) INTEGRALLY MOLDED SOUND HOUSING FOR BLOWER MOTOR

(75) Inventors: Jeffrey Charles Kinmartin, East Amherst, NY (US); Garrett Wade Hoehn, Kenmore, NY (US); John W. McLaughlin, Williamsville, NY (US); Edward Douglas Pettitt, Burt, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/104,359

(22) Filed: Apr. 12, 2005

(65) Prior Publication Data

US 2005/0254975 A1 Nov. 17, 2005

Related U.S. Application Data

(60) Provisional application No. 60/570,366, filed on May 12, 2004.

(51) Int. Cl.
 *F04B 17/03* (2006.01)
 *H02K 5/00* (2006.01)
(52) U.S. Cl. .................... 417/423.14; 310/89
(58) Field of Classification Search ........... 417/423.14, 417/312, 423.15; 310/89
 See application file for complete search history.

(56) References Cited

U.S. PATENT DOCUMENTS

| 2,089,601 | A | * | 8/1937 | Faber ........................ 415/119 |
| 3,456,685 | A | * | 7/1969 | Hughes et al. ......... 137/565.13 |
| 5,716,200 | A | * | 2/1998 | Mirumachi et al. ......... 417/360 |
| 5,786,647 | A | | 7/1998 | Vollmer ........................ 310/89 |
| 5,905,320 | A | | 5/1999 | Periyathamby ............... 310/89 |
| 6,035,485 | A | | 3/2000 | Holsten ........................ 15/326 |
| 6,048,024 | A | | 4/2000 | Wallman ............... 297/180.14 |
| 6,076,795 | A | * | 6/2000 | Scheidel et al. ............. 248/603 |
| 6,262,504 | B1 | | 7/2001 | Bartlett ........................ 310/89 |
| 6,406,275 | B1 | * | 6/2002 | Hoehn ........................ 417/366 |
| 6,448,678 | B1 | | 9/2002 | Simpson ...................... 310/89 |
| 6,717,299 | B2 | | 4/2004 | Bacile ......................... 310/51 |

FOREIGN PATENT DOCUMENTS

JP 03236581 10/1991

* cited by examiner

*Primary Examiner*—Charles G. Freay
(74) *Attorney, Agent, or Firm*—Patrick M. Griffin

(57) ABSTRACT

A heating and air-conditioning (HVAC) module for an automotive vehicle wherein the electric motor for the blower includes a double walled motor housing for noise abatement. The housing defines a cup-shaped inner casing with an open end and a closed end. An outer casing surrounds and is integrally connected to the inner casing by an integral flange. The outer casing extends upwardly from the flange to a rim to define a space surrounding the inner casing. An end cap includes a groove to engage the rim and extends over and in spaced relationship to the closed end of the inner casing. The end cap is held in place by fasteners threaddedly engaging posts extending upwardly from the flange, with one of the posts extending upwardly from a female electrical connector that extends radially between the outer casing and the inner casing for supplying electrical power to the motor.

20 Claims, 3 Drawing Sheets

INTEGRALLY MOLDED SOUND HOUSING FOR BLOWER MOTOR

CROSS REFERENCE TO RELATED APPLICATION

This application claims priority to provisional application 60/570,366 filed May 12, 2004.

BACKGROUND OF THE INVENTION

1. Field of the Invention

A motor housing assembly of the type for enclosing a blower motor in an automotive heating and air conditioning (HVAC) system.

2. Description of the Prior Art

The electric motor used to power the fan in the HVAC system is typically retained in a motor housing assembly that is mounted to the HVAC housing. These motors produce disagreeable levels of noise such as the tick-click noise generated by the travel of the brushes of the motor over the separation gaps in the commutator at low rotational speeds. Such noise can also be generated by debris in the motor or imperfections in the thrust bearings or excessive clearance between the shaft and the bearings of the motor. Various techniques have been employed to isolate the vibrations and noise generated by the motor from the adjoining structure. For example, it has been known to use elastomeric grommets that surround the fasteners used to secure the motor housing assembly to the air case. It has also been known to make the motor housing assembly from a resilient, vibration-damping material. In addition, a hush panel attached to the underside of the instrument panel absorbs or masks such noise. In some cases, a separate motor cover with a foam lining covers the motor. Examples of the prior art housings are disclosed in U.S. Pat. No. 5,786,647 to Vollmer et al.; U.S. Pat. No. 5,905,320 to Periyathamby et al.; U.S. Pat. No. 6,262,504 to Bartlett; U.S. Pat. No. 6,448,678 to Simpson and U.S. Pat. No. 6,717,299 to Bacile et al.

When the motor housing assembly is made from more rigid materials, such as plastics, it has also been known to wrap or otherwise surround the circumference of the motor with a resilient band or shroud intended to isolate the motor from the motor housing assembly. When the motor is received in the motor housing assembly, the vibrations and noise generated by the motor are dampened by the band or shroud and are not transmitted radially outwardly to the HVAC housing. Other motor housing assemblies incorporate one or more damping pads located between an end of the motor and the motor housing.

SUMMARY OF THE INVENTION AND ADVANTAGES

A motor housing defining a cup-shaped inner casing with an open end for receiving a motor and a partially closed end opposite the open end such that the output shaft of the motor can extend from the open end. The housing includes an outer casing spaced from and surrounding the inner casing and extending from the open end of the inner casing to a rim adjacent the closed end of the inner casing to define a space between the inner casing and the outer casing. An end cap is configured to engage the rim and to extend over and in spaced relationship to the closed end of the inner casing.

Accordingly, the invention reduces the cost and complexity of reducing the noise by integrally molding a noise barrier such that a cap engages the noise barrier to capture the noise. The barrier may be customized to optimize the noise reduction. The invention eliminates the need for a separate cover to attenuate the noise.

In addition, the invention provides superior noise containment compared to separate motor covers by eliminating clearance gaps and reducing interface joints that may allow sound transmission. Finally, the integrally molded sound barrier wall contributes to the structural rigidity of HVAC case thus reducing potential structural resonances that may amplify noise.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Figure 1:
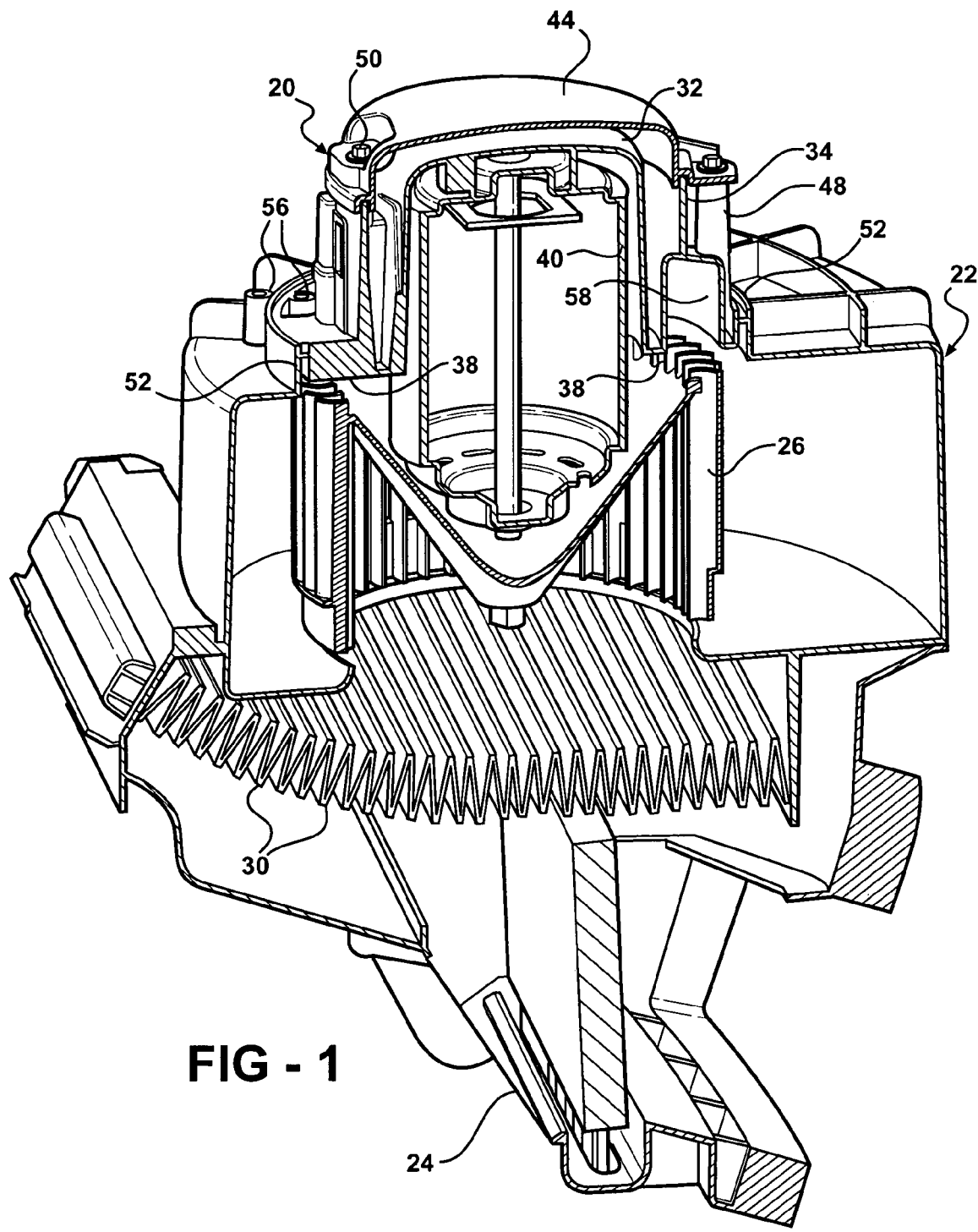
FIG. 1 is a perspective view partially cut away and in cross section of a HVAC module incorporating the blower motor and motor housing.
Figure 2:
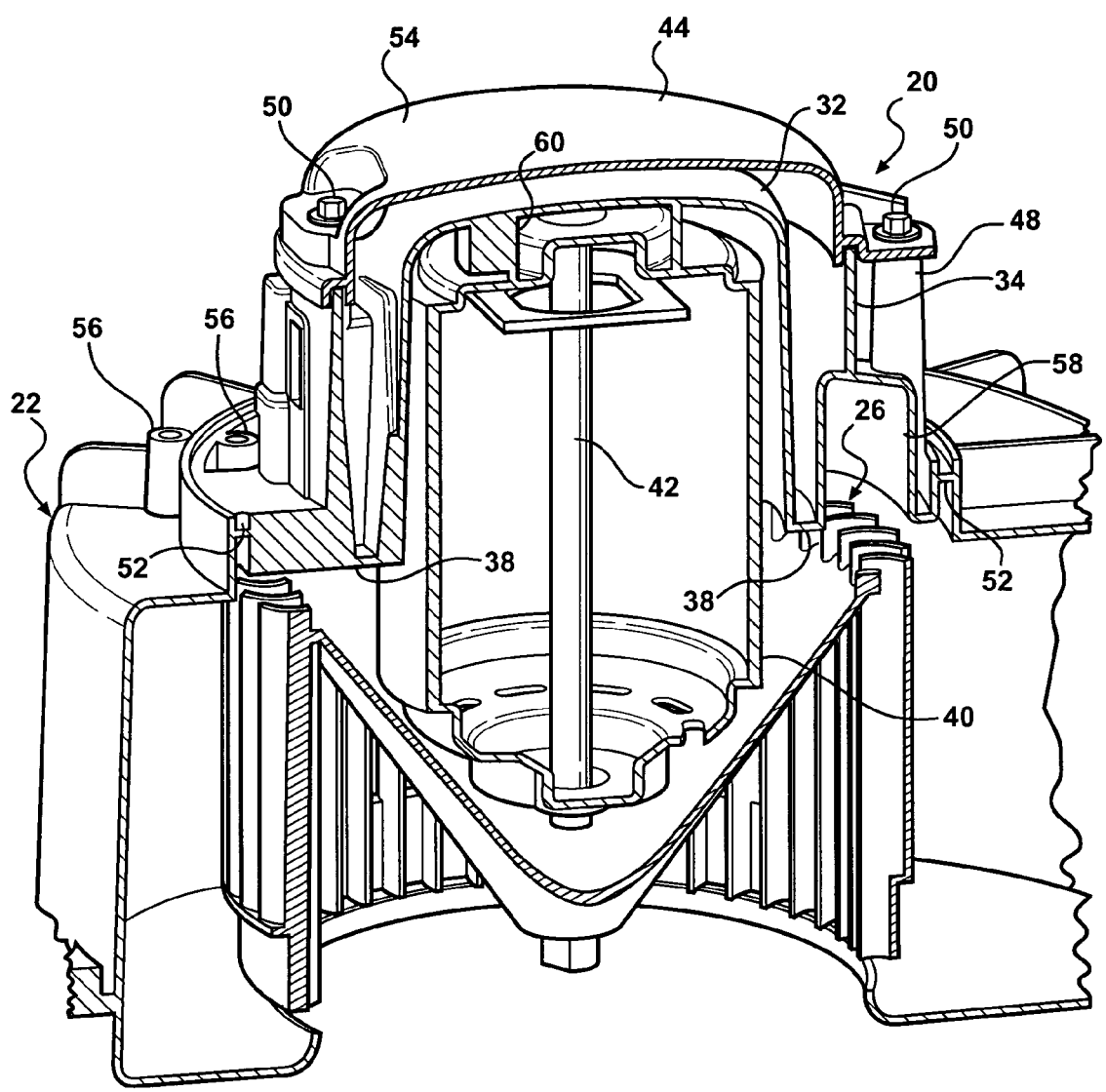
FIG. 2 is a fragmentary perspective view similar to FIG. 1 but enlarged and partially cut away and in cross section of a HVAC module incorporating the blower motor and motor housing.

A heating and air-conditioning (HVAC) module for an automotive vehicle is shown in FIG. 1 and includes an enclosure for distributing air to a vehicle compartment. The HVAC enclosure includes a cylindrical motor housing 20 and a blower casing 22, generally indicated. An inlet case including a panel valve or door 24 is supported by the enclosure for directing air moving through the enclosure. The air is moved through the enclosure by a fan blade or an impeller 26 disposed in the blower casing 22, the blower casing 22 being spaced outwardly from the axis of rotation of the impeller 26 for the movement of air. The vertically disposed blades of the impeller are supported by an inverted cone. A filter 30 extends across the enclosure for removing unwanted particulates from the air.

The motor housing 20 defines a cup-shaped inner casing 32 with an open end and a closed end opposite the open end and an outer casing 34 spaced from and surrounding the inner casing 32 and extending upwardly from the open end of the inner casing 32 to a circular rim 36 vertically adjacent the closed end of the inner casing 32 to define a space surrounding the inner casing 32 between the inner casing 32 and the outer casing 34. The inner casing 32 and the outer casing 34 are cylindrical in shape and are integrally connected together by a flange 38 extending from the open end of the inner casing 32 outwardly across the space to the outer casing 34 and continues to extend radially outward from the outer casing 34 to a perimeter integrally connected to the blower casing 24.

The motor is disposed in the inner casing 32 and has an encasement or motor shell 40 spaced from the inner casing 32.and defining an axial length and an output shaft 42 extending from the open end of the inner casing 32 to a distal end supporting the impeller 26.

An end cap 44 is configured to engage the rim 36 and to extend over and in spaced relationship to the closed end of the inner casing 32. The end cap 44 has an annular groove 46 extending about its circumference for snugly receiving the rim 36 of the outer casing 34.

Figure 3:
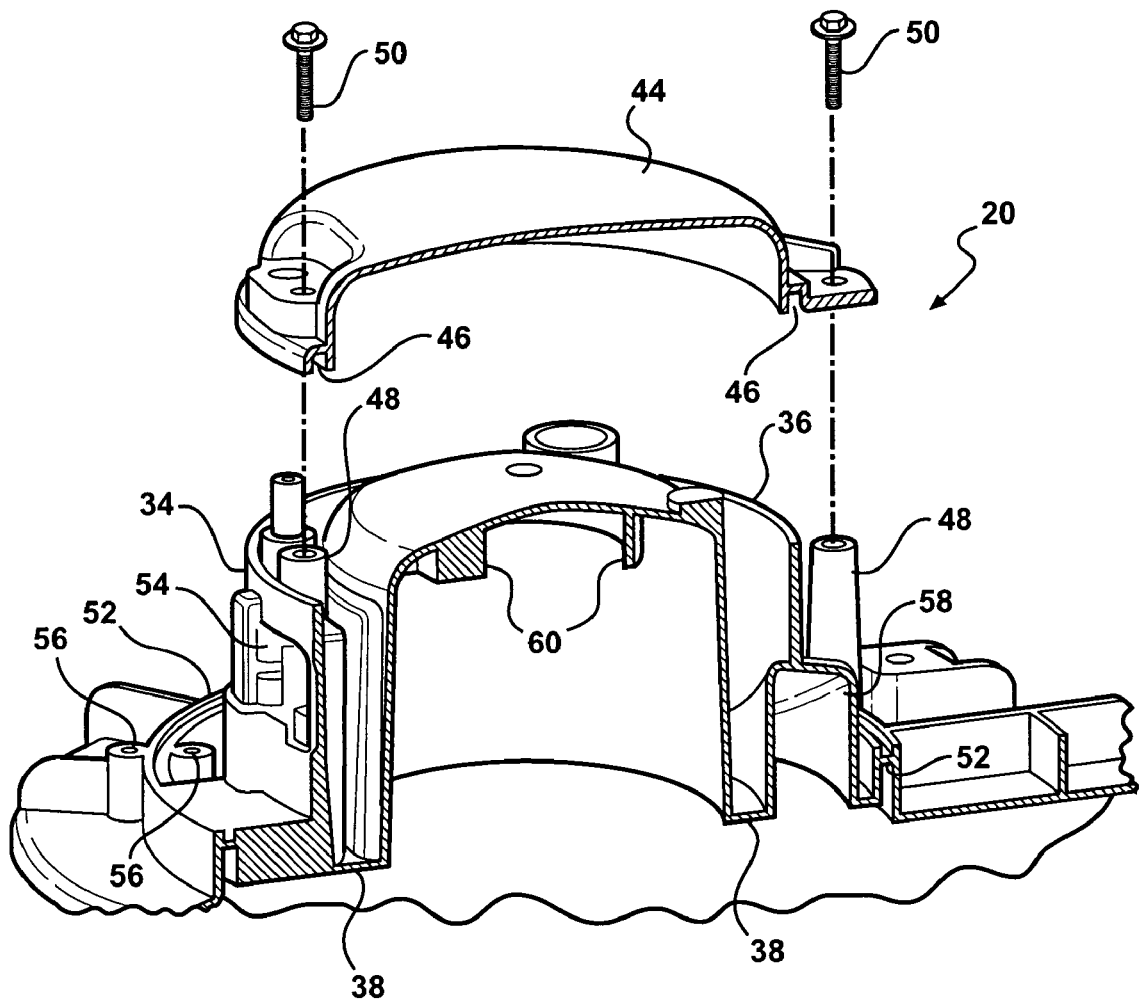
FIG. 3 is an exploded, perspective view partially cut away and in cross section but without showing the motor.

The motor housing 20 includes a plurality of abutments or posts 48 for receiving a fastener 50 to retain the end cap 44 in engagement with the rim 36. The flange 38 extends radially outward from the outer casing 34 to a perimeter defined by a breakaway web 52 integrally interconnecting the housing 20 to the blower casing 22 for fracturing to separate the housing 20 from the blower casing 22. As most clearly shown in FIG. 3, the post 48 on the right extends from the flange 38 parallel to the outer casing 34 to a position adjacent the closed end and is disposed between the outer casing 34 and the breakaway web 52 at the perimeter. The post 48 on the left extends upwardly from a female connector 54 between the inner casing 32 and the outer casing 34. The female connector 54 is an electrical socket for receiving electrical power for the motor from an electrical plug inserted into the female connector 54. The electrical connector 54 is female and extends radially into and between the outer casing 34 and the inner casing 32. The fasteners 50 are threaded and screw into holes in the posts 48 to tighten the end cap 44 onto the rim 36 of the outer casing 34.

The breakaway web 52 integrally interconnecting the flange 38 and the blower casing 22 at the perimeter is formed for fracturing to separate the motor housing 20 from the blower casing 22 at the perimeter. Such fracturing is usually done to remove and service the motor. The same motor housing 20 may be reinstalled or a replacement can be installed, both of which would terminate at the perimeter of the flange 38 without a web 52. In order to connect or mount the repaired or replacement motor housing 20 and motor, support devices 56 are disposed on each side of the breakaway web 52 for reconnecting a motor housing 20 to the blower casing 24 after the web 52 is fractured. These support devices 56 comprise screw receiving abutments into which fasteners 50 may be threaded with a strap or the like extending across the web 52 gap between each pair of abutments.

The outer casing 34 also defines a integral cooling air channel 58 for receiving air from the impeller 28 and directing that air upward and about the encasement 40 to cool the motor 22. The inner casing 32 may also include ribs 60 or the like against which the encasement 40 is mounted.

The motor housing 20 is integrally molded of an organic polymeric material to define at least two walls circling the motor combined with the end cap 44 to contain the noise of the motor. The motor housing 20 may be formed as circular, i.e., cylindrical, or may be a customized shape to optimize its acoustic reduction capability. The cylindrical wall of the inner casing 32 is generally 1.75 mm or greater in thickness and in close proximity to the encasement 40 for the motor and functions to also support and hold the motor. It is optional to place damping or sound absorbent material in the space between the inner casing 32 and the encasement 40 for the motor.

The outer casing 34 defines a second wall that is integrally molded with the inner casing 32 and blower casing 24 through the interconnecting flange 38 at some distance outward of the inner casing 32 to form an air gap or space between the inner casing 32 and the outer casing 34. Although the second wall is shown as cylindral its shape may be optimized such that it is non-cylindrical. The outer casing 34 acts as another sound barrier to block the tick-click noise from emanating into the passenger compartment. The gap or space between the inner casing 32 and the outer casing 34 may be left void or filled with sound absorbent material such as closed or open cell foam, rubber fibrous material, etc. to add additional sound absorbent capability. Also, additional walls may be added to increase the sound blocking capability. For example, a third wall can also be integrally molded to increase the sound blocking capability.

The end cap 44 completes a second enclosure around the motor and may be attached in a variety of ways such as with screws, integrally molded snap features, ultra-sonic welds, adhesive, clips, etc. The end cap 44 may be a separately molded piece or integrally molded with the outer casing 34 via a flexible hinge (not shown) connected to the rim 36 of the outer casing 34, The end cap 44 may be formed such that it contains multiple layers and/or internal cavities or is double walled to enhance acoustic performance. In addition, the end cap 44 could be formed with a filler tube to allow injection of expanding foam liquid to fill the inner void or space around the motor with noise abatement material.

Obviously, many modifications and variations of the present invention are possible in light of the above teachings. The invention may be practiced otherwise than as specifically described within the scope of the appended claims.

What is claimed is:

1. A motor housing assembly comprising;
a motor housing defining a cup-shaped inner casing with an open end for receiving a motor and a closed end opposite said open end such that a motor output shaft can extend from said open end,
said motor housing including an outer casing spaced from and surrounding said inner casing and extending from said open end of said inner casing to a rim adjacent said closed end of said inner casing to define a space surrounding said inner casing between said inner casing and said outer casing, wherein said inner casing and said outer casing are integrally connected together by a flange extending from said open end outwardly across said space to said outer casing, and
an end cap configured to engage said rim and to extend over and in spaced relationship to said closed end of said inner casing.

2. An assembly as set forth in claim 1 including a motor having a rotor, a stator, and an encasement surrounding the rotor and the stator and defining an axial length, and an output shaft extending from said open end of said inner casing to a distal end.

3. An assembly as set forth in claim 2 including an impeller connected to said distal end of said shaft for moving air.

4. An assembly as set forth in claim 3 wherein said motor housing includes an electrical connector for receiving electrical power for said motor.

5. An assembly as set forth in claim 4 wherein said electrical connector is female and extends radially into and between said outer casing and said inner casing.

6. An assembly as set forth in claim 2 wherein said motor encasement is spaced from said inner casing.

7. An assembly as set forth in claim 1 wherein said motor housing includes a female electrical connector extending radially into and between said outer casing and said inner casing.

8. An assembly as set forth in claim 1 wherein said housing includes a plurality of abutments for receiving a fastener to retain said end cap in engagement with said rim.

9. An assembly as set forth in claim 8 wherein said housing includes a female electrical connector extending radially into and between said outer casing and said inner casing, one of said abutments extending from said female connector between said inner casing and said outer casing.

10. An assembly as set forth in claim 8 wherein said flange extends radially outward from said outer casing to a perimeter and one of said abutments defines a post extending from said flange parallel to said outer casing to a position adjacent said closed end.

11. An assembly as set forth in claim 10 wherein said post is disposed between said perimeter and said outer casing.

12. An assembly as set forth in claim 1 wherein said flange extends radially outward from said outer casing to a perimeter and including a blower casing for surrounding an impeller and being integrally connected to said flange at said perimeter by a breakaway web for fracturing to separate said housing from said blower casing.

13. An assembly as set forth in claim 12 including support devices disposed on each side of said breakaway web for reconnecting a housing to said blower casing after said web is fractured.

14. A heating and air-conditioning (HVAC) module for an automotive vehicle comprising;
  an enclosure for distributing air to a vehicle compartment and including a blower casing,
  an impeller disposed in said blower casing for moving air through said enclosure,
  a heat exchanger supported by said enclosure for exchanging heat with air moving through said enclosure,
  a housing defining a cup-shaped inner casing with an open end and a closed end opposite said open end and an outer casing spaced from and surrounding said inner casing and extending from said open end of said inner casing to a rim adjacent said closed end of said inner casing to define a space surrounding said inner casing between said inner casing and said outer casing,
  said inner casing and said outer casing being integrally connected together by a flange extending from said open end of said inner casing outwardly across said space to said outer casing and radially outward from said outer casing to a perimeter integrally connected to said blower casing,
  a motor disposed in said inner casing and having an encasement and an output shaft extending from said open end of said inner casing to a distal end supporting said impeller, and
  an end cap configured to engage said rim and to extend over and in spaced relationship to said closed end of said inner casing.

15. An assembly as set forth in claim 14 including an electrical connector extending radially into and between said inner casing and said outer casing.

16. An assembly as set forth in claim 14 wherein said housing includes a plurality of abutments for receiving a fastener to retain said end cap in engagement with said rim.

17. An assembly as set forth in claim 16 wherein said housing includes a female electrical connector extending radially into and between said outer casing and said inner casing and one of said abutments extends from said female connector between said inner casing and said outer casing.

18. An assembly as set forth in claim 14 wherein said flange extends radially outward from said outer casing to a perimeter and one of said abutments defines a post extending from said flange parallel to said outer casing to a position adjacent said closed end.

19. An assembly as set forth in claim 18 wherein said post is disposed between said perimeter and said outer casing.

20. An assembly as set forth in claim 14 wherein said flange extends radially outward from said outer casing to said perimeter and including a breakaway web integrally interconnecting said flange and said blower casing at said perimeter for fracturing to separate said housing from said blower casing at said perimeter.

* * * * *